United States Patent
De Rosa et al.

(10) Patent No.: US 9,215,151 B1
(45) Date of Patent: Dec. 15, 2015

(54) DYNAMIC SAMPLING RATE ADJUSTMENT FOR RATE-LIMITED STATISTICAL DATA COLLECTION

(75) Inventors: Michael De Rosa, Pittsburgh, PA (US); Marc Unangst, Pittsburgh, PA (US)

(73) Assignee: GOOGLE INC., Mountain View, CA (US)

( * ) Notice: Subject to any disclaimer, the term of this patent is extended or adjusted under 35 U.S.C. 154(b) by 940 days.

(21) Appl. No.: 13/342,476

(22) Filed: Jan. 3, 2012

Related U.S. Application Data

(60) Provisional application No. 61/570,521, filed on Dec. 14, 2011.

(51) Int. Cl.
  *G06F 15/173* (2006.01)
  *H04L 12/26* (2006.01)

(52) U.S. Cl.
  CPC .................................... *H04L 43/024* (2013.01)

(58) Field of Classification Search
  CPC ...................................................... H04L 43/024
  USPC ......................................................... 709/224
  See application file for complete search history.

(56) References Cited

U.S. PATENT DOCUMENTS

| | | | |
|---|---|---|---|
| 7,330,901 B2 * | 2/2008 | Yoneda et al. | 709/231 |
| 7,342,929 B2 | 3/2008 | Bremler-Barr et al. | |
| 7,657,333 B2 * | 2/2010 | Bradford et al. | 700/51 |
| 7,908,360 B2 * | 3/2011 | Gach et al. | 709/224 |
| 8,040,798 B2 | 10/2011 | Chandra et al. | |
| 8,059,541 B2 | 11/2011 | Karagiannis et al. | |
| 2002/0032717 A1 | 3/2002 | Malan et al. | |
| 2006/0036756 A1 * | 2/2006 | Driemeyer et al. | 709/231 |
| 2006/0268787 A1 * | 11/2006 | Strutt et al. | 370/335 |
| 2007/0046508 A1 * | 3/2007 | Nishikawa | 341/61 |
| 2007/0171824 A1 | 7/2007 | Ruello et al. | |
| 2008/0291915 A1 | 11/2008 | Foschiano | |
| 2011/0191414 A1 * | 8/2011 | Ma et al. | 709/203 |
| 2012/0056649 A1 * | 3/2012 | Lin | 327/113 |

* cited by examiner

*Primary Examiner* — Jason Recek
(74) *Attorney, Agent, or Firm* — Young Basile Hanlon & MacFarlane P.C.

(57) ABSTRACT

Methods and apparatuses for dynamically adjusting sampling rates for statistical data collection are taught. Records associated with a first task communicating with a second task that are sampled at a first sampling rate are received. At least the first task is associated with a first processing job. A target sampling rate for the first processing job is determined using the records where the target sampling rate is based on a minimum sampling quota and a maximum sampling quota. The target sampling rate is compared to the first sampling rate, and a determination of whether to adjust the first sampling rate to the target sampling rate is based on a result of the comparison. In this manner, tracing of processing jobs, such as those including a plurality of tasks, can be adjusted based on the needs and size of the job and network limitations.

14 Claims, 3 Drawing Sheets

DYNAMIC SAMPLING RATE ADJUSTMENT FOR RATE-LIMITED STATISTICAL DATA COLLECTION

CROSS-REFERENCE TO RELATED APPLICATIONS

This application claims priority to U.S. Provisional Patent Application No. 61/570,521, filed Dec. 14, 2011, which is hereby incorporated by reference in its entirety.

TECHNICAL FIELD

The present invention relates in general to networking and more particularly to collecting statistical data over a network.

BACKGROUND

In a distributed computing system, remote procedure calls (RPCs) are often used to distribute computing jobs over a number of connected computers. A remote procedure call is generally defined as a request message sent to a remote computer to execute a specified procedure or task with supplied parameters.

SUMMARY

In statistical data collection over a network, such as that involved with monitoring RPCs, sampling rate is an important tracing parameter. Herein, embodiments of an apparatus and method for dynamically adjusting a sampling rate for statistical data collection, particularly where the data collection is rate limited, are disclosed. In accordance with one aspect of the disclosed embodiments, a method of dynamically adjusting sampling rate for statistical data collection comprises receiving records associated with a first task communicating with a second task and sampled at a first sampling rate, at least the first task associated with a first processing job, determining a target sampling rate for the first processing job using the records, the target sampling rate based on a minimum sampling quota and a maximum sampling quota, comparing the target sampling rate to the first sampling rate, and determining whether to adjust the first sampling rate to the target sampling rate based on a result of the comparison.

Another aspect of the disclosed embodiments comprises an apparatus for dynamically adjusting sampling rate for statistical data collection, the apparatus comprising a server including memory and a processor configured to execute instructions stored in the memory to receive records associated with a first task communicating with a second task and sampled at a first sampling rate, at least the first task associated with a first processing job, determine a target sampling rate for the first processing job using the records, the target sampling rate based on a minimum sampling quota and a maximum sampling quota, compare the target sampling rate to the first sampling rate, and determine whether to adjust the first sampling rate to the target sampling rate based on a result of the comparison.

Variations of these methods and apparatuses and details of other aspects and embodiments are described in additional detail hereinafter.

BRIEF DESCRIPTION OF THE DRAWINGS

The description herein makes reference to the accompanying drawings wherein like reference numerals refer to like parts throughout the several views, and wherein.

DETAILED DESCRIPTION

Statistical models of remote procedure call (RPC) behavior can be computed by using sampled data from all services in production that include RPCs. By modeling this behavior, among other benefits, computing load can be distributed more evenly. According to one implementation of such modeling, a default sampling rate that results in sampling a portion (e.g. $1/1000^{th}$) of all traffic can be used. Unfortunately, such a default sampling rate can be too low for a small service (resulting in incomplete or missing statistics) and too high for a large service (resulting in an inordinate load on the infrastructure used to collect and statistically model the RPC behavior).

In contrast, embodiments taught herein use dynamic sampling rate adjustment that varies the sampling rate. The rate can be varied based on the needs of the service and the desired amounts of trace data to be collected over the network. Although the description below uses RPC traffic to explain certain principles, the teachings herein are applicable to any sampling-based statistical data gathering. The teachings herein can therefore be utilized by any group that collects sampled data from a wide variety of sources where the rate of data production varies significantly from source to source and where there is a minimum sampling rate (in samples/second, for example) necessary to establish valid statistical data. This includes, without limitation, traffic monitoring, capacity planning, anomaly detection and production monitoring/alerting.

Figure 1:
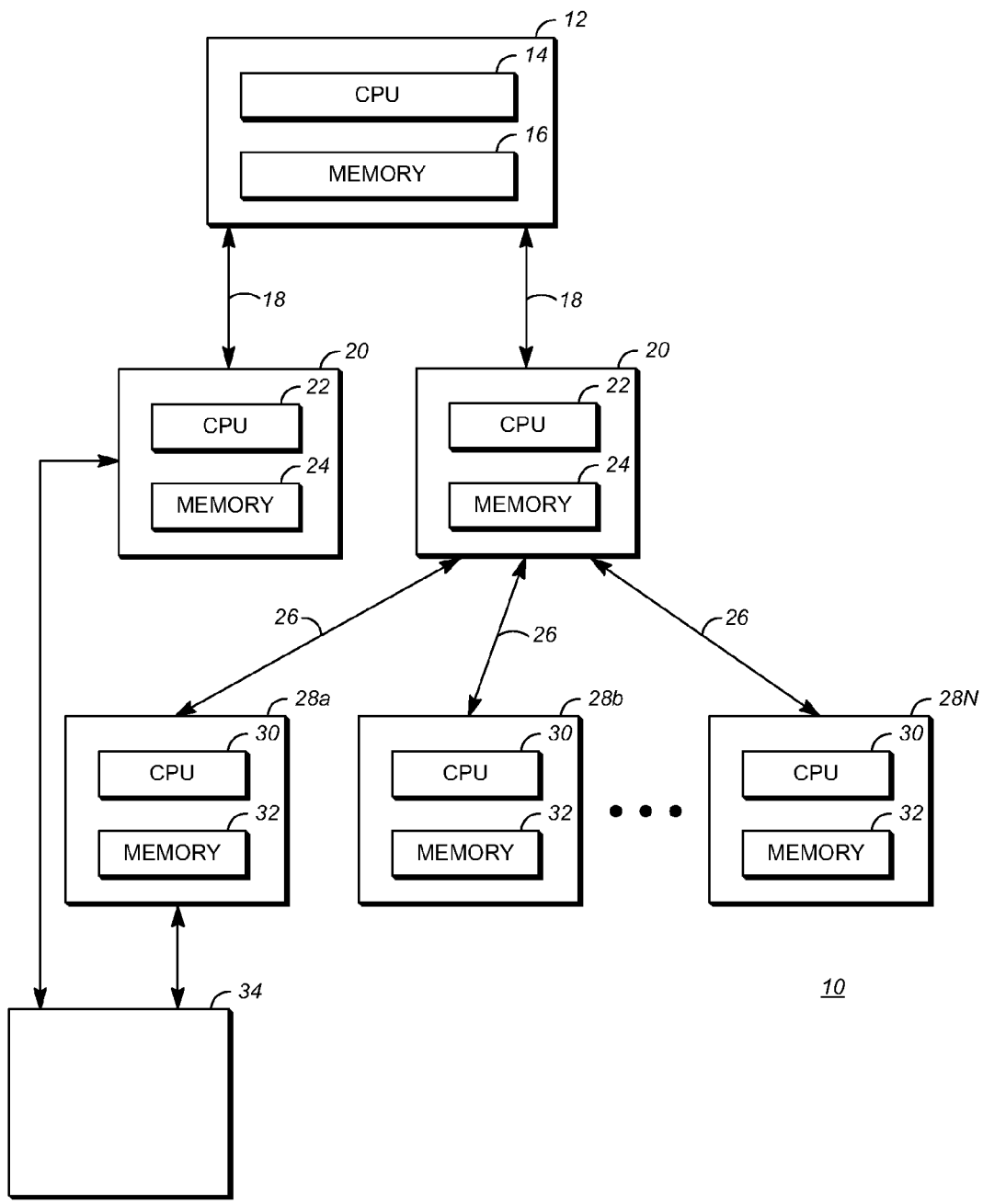
FIG. 1 is a schematic of a network with a multi-tier server architecture in which embodiments of the present invention can be implemented.

FIG. 1 is a schematic of a network 10 with a multi-tier server architecture in which embodiments of the present invention can be implemented. Network 10 may be the Internet. Network 10 may also be a local area network (LAN), wide area network (WAN), virtual private network (VPN), or any other means of transferring data between one or more clients and/or servers forming network 10. One exemplary server 12 may be, for example, a computer having an internal configuration of hardware including a processor such as a central processing unit (CPU) 14 and a memory 16. CPU 14 is a controller for controlling the operations of server 12. CPU 14 is connected to memory 16 by, for example, a memory bus (not shown). Memory 16 may be random access memory (RAM), read only memory (ROM) and/or any other suitable memory device. Memory 16 can store data and program instructions that are used by CPU 14. Other suitable implementations of server 12 are possible. Server 12 implements a dynamic sampling rate adjustment described later and is hereinafter referred to as control server 12 to distinguish it from other servers of network 10. Note that although the term server is used herein, this is not intended to be exclusive and the servers could be clients or other devices connected in a network 10.

Control server 12 can be connected to one or more remote coordinator servers 20 through a first network connection 18. Coordinator server 20 in these examples may be a computer having an internal configuration of hardware including a processor such as a CPU 22 and a memory 24. CPU 22 is a controller for controlling the operations of coordinator server 20. CPU 22 is connected to memory 24 by, for example, a memory bus (not shown). Memory 24 may be RAM, ROM and/or any other suitable memory device. Memory 24 can store data and program instructions that are used by CPU 22. Other suitable implementations of coordinator server 20 are possible.

Each coordinator server 20 is connected to at least one remote worker server. In FIG. 1, each coordinator server 20 is connected to each of N remote worker servers 28a, 28b . . . 28N (collectively, worker servers 28) through a respective second network connection 26. For clarity, worker servers 28 of only one of the coordinator servers 20 are shown. In this example, each worker server 28 is a computer having an internal configuration of hardware including a processor such as a CPU 30 and a memory 32. CPU 30 is a controller for controlling the operations of a respective worker server 28a-28N. CPU 30 is connected to memory 32 by, for example, a memory bus (not shown). Memory 32 may be RAM, ROM and/or any other suitable memory device. Memory 32 can store data and program instructions that are used by CPU 30. Other suitable implementations of worker servers 28 are possible. Although each worker server 28a-28N is shown as a separate computer in this example, any of worker servers 28a-28N could be combined into a single computer with more than one processor performing respective functions. Moreover, there may be more than one level of worker servers 28.

First network connections 18 and second network connections 26 comprise any way of connecting servers 12, 20 and 28 to form a network. For example, connections 18, 26 can be hardwired or wireless connections operating according to any number of known communication protocols. Moreover, while control server 12 is shown connected to coordinator servers 20 only for illustrative purposes, in general all of servers 12, 20 and 28 are connected in a single network, so connections between control server 12 and worker servers 28 can be made directly merely by addressing those servers 28.

Other implementations of network 10 are possible. For example, one or more intermediate tiers (e.g. servers) can be included to form a multi-tier server architecture that further implements flow control over network 10. According to one such example, a balancer server having a configuration similar to coordinator servers 20 can be connected to network 10 by network connections similar to connections 18, 26 in order to assign data requests to various coordinator servers 20. This would be particularly useful where multiple clients are making data requests. Also, although network 10 is described as one network herein, network 10 could comprise two or more different networks. For example, servers 12, 18 could form nodes on the Internet, while servers 28 could form nodes on a WAN. Other arrangements are possible.

At least three worker servers 28 are connected to coordinator server 20 in this example, but fewer or more are possible. Moreover, the same or a different number of worker servers 28 can be connected to each coordinator server 20.

In another aspect, one or more of control server 12, coordinator server 20 or worker server 28a-28N can include a display configured to display sampling queries and/or the data responsive to the queries. If used, a display may be implemented in various ways, including by a liquid crystal display (LCD) or a cathode-ray tube (CRT) or light emitting diode (LED) display, such as an OLED display. Any of servers 12, 20 or 28a-28N can also include a keyboard or other device for input by a user.

Tasks in production within servers of network 10 (hereinafter called processing jobs) are initiated by coordinator servers 20 in this example. A processing job is initiated when one of coordinator servers 20 executes a series of commands that instructs worker servers 28 to perform a process such as computation, lookup or storage activity. This could involve, for example, spelling corrections, uploading pictures, transcoding videos, editing word-processing documents, updating databases such as distributed databases, etc. In the examples herein, the processing job described is data collection so the series of commands instructs worker servers 28 to perform data collection and collects the data from worker servers 28. Conventionally, this is performed by coordinator server 20 performing a task that issues a RPC to these known servers 28 to execute a specified procedure or task with supplied parameters. In one exemplary embodiment, the RPC includes parameters such as a number of keywords and invokes tasks that obtain data related to the number of keywords, such as how many times an ad is displayed over a period of time in response to each keyword and what the "click-through" rate is. These tasks would be associated with a singled named job, such as "collect_ads". The other coordinator server 20 could, for example, perform data collection related to email, such as bandwidth used, etc., by issuing a RPC to the same or a different set of worker servers 28. Each task of the data collection would be associated with a separate named job, such as "email_stats". As can be seen, the RPCs can involve very large query sets. Each coordinator server 20 accordingly shards (i.e., splits) the query for processing by worker servers 28. Thus, each worker server 28a-28N gets a portion of the parameters upon which the query is to be performed, and the tasks they perform in response are associated with one of the named jobs. Smaller processing jobs can also be performed. In a large network, 70,000 or more jobs can be running at any given time.

Although coordinator servers 20 initiate a respective processing job in this implementation, processing jobs could be initiated by a client performing a task that transmits a request to one or more coordinator servers 20, either directly or through a balancer server as discussed previously. This request could itself be a RPC that calls for coordinator server 20 to execute a remote task comprising the series of commands that instructs worker servers 28 to perform the data collection and collects the data from worker servers 28. In that case, the series of commands can include a command to return the collected data to the client. A client would generally have a configuration similar to servers 12, 20, 28. Worker servers 28 can perform their task by accessing their own databases for the requested data, or by accessing one or more database servers having a configuration similar to servers 12, 20, 28 through connections similar to network connections 18, 26. For example, FIG. 1 shows a downstream database server 34 connected to one coordinator server 20 and one worker server 28a to demonstrate schematically an example where a task on coordinator server 20 and a task on worker server 28a access or communicate with one or more tasks on database server 34.

In order to analyze the processing jobs, behavior of RPCs can be statistically modeled (or traced) by sampling records associated with the RPCs, including data collected responsive to the RPCs. As used herein, a job or processing job refers to a collection of one or more tasks, each of which is a computational process executing on a server. Multiple tasks associated with a job can operate on the same or a different server, and any given server can perform tasks associated with more than one job. For explanatory purposes, however, each task is discussed as existing on a distinct server. For example, the sharded query described above comprises one processing job but involves at least N tasks (i.e., one for each worker server 28a . . . 28N). A request is issued to generate a trace of one or more tasks, where a trace is a collection of sampled records or data related to the task responsive to the parameters of the requesting query, including trace ID, time, etc. Accordingly, the terms trace and sample and their variations are used interchangeably herein.

Figure 2:
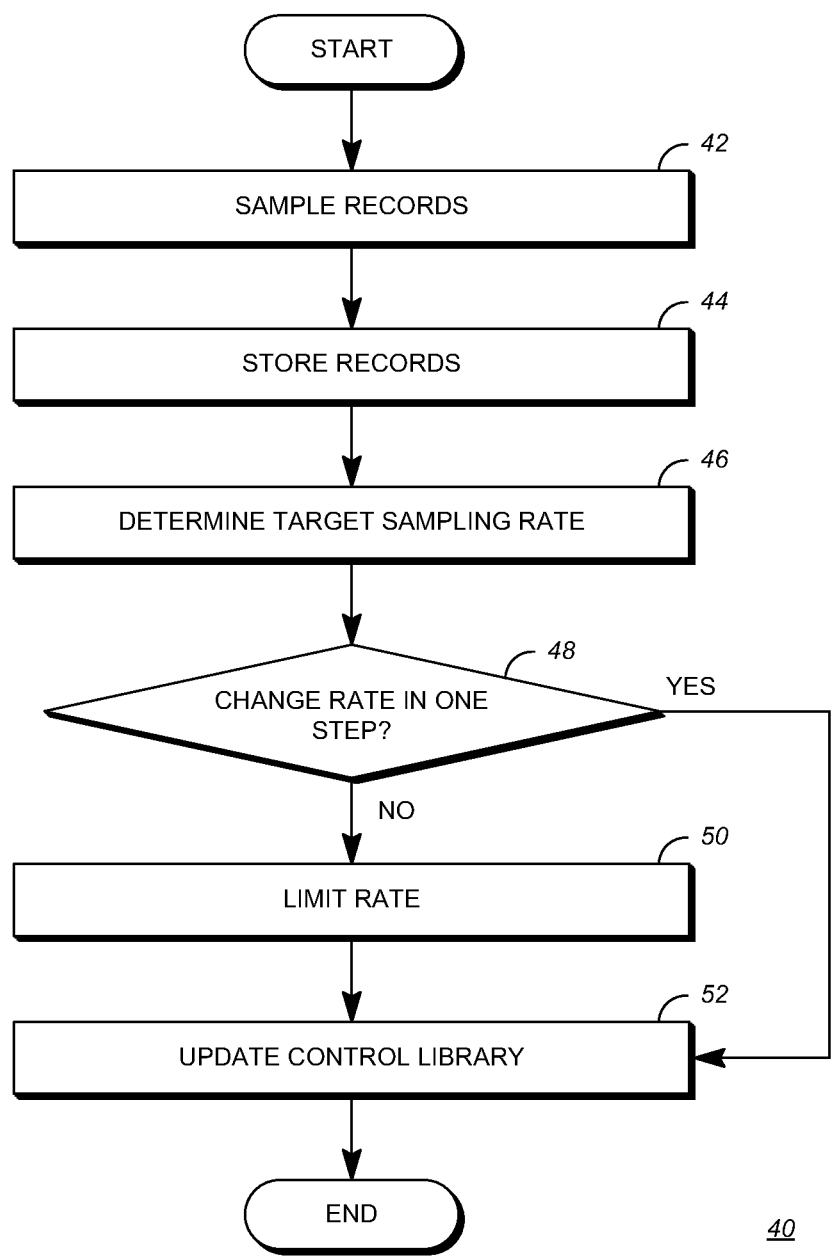
FIG. 2 is a flow chart showing processing to update sampling rates according to an embodiment.

FIG. 2 is a flow chart showing processing to update sampling rates according to an embodiment. The processing of FIG. 2 can be repeated periodically.

Processing in FIG. 2 starts at step 42 when a respective server samples records associated with one or more jobs using defined tracing parameters. More specifically, the records are associated with a communication between a first task and at least a second task. The first and second tasks can be associated with the same job or with different jobs. In less frequent situations, the first task communicates with itself such that the second task is the same as the first task. The tracing parameters specify what records are requested related to the tasks as well as the frequency of collection. In one embodiment, the sampled records include some relevant data produced by worker server(s) 28, the sampling rate associated with the data, the source task (e.g. the name of the processing job), and the task that requested the sampling. In the case where the requesting task includes a RPC, the requesting task is usually the root of the RPC call tree, e.g. a user-initiated action, and recording this data can be used for computing and enforcing quotas as discussed in additional detail hereinafter. As a result, when the task includes a RPC that calls or communicates with another task, tracing would occur for all tasks called by child RPCs of this parent RPC. Therefore, to sample records associated with an entire processing job where a client initiated the job by sending a RPC to coordinating server 20, which in turn issued RPCs to each of worker servers 28 as part is its task, a request could be issued to trace at least one of the initial or parent RPCs from the client. A bit would be assigned to those of the RPCs selected for tracing, and child RPCs of each selected RPC, if any, would be similarly identified. In some cases, tracing the processing job only after it reaches a certain point in network 10, such as one of worker servers 28, is desirable. In that case, a request to trace could be issued for the task associated with that worker server 28.

Every processing job has a name, and the sampling rate associated with the tasks and hence with the related processing job is stored in memory 16 in what is hereinafter called a control library. The control library could also be stored remotely from control server 12. The sampling rate can be stored as a probability that the task operating on a server is selected for tracing by that server. As a result, for example, that sampling rate is applied individually to each RPC issued by the task. Control server 12 or another server transmits the sampling rates to servers sampling their tasks from control library. This could on a periodic basis or otherwise by the server, or could be done responsive to a request from one or more servers doing the sampling. In the initial processing of step 42, a single default sampling probability is used for all sampled tasks, but this is not necessary. For example, a default sampling probability of 1/1000 could be used, and this would generate different sampling rates for various tasks as described below. Although sampling probability and sampling rate are two different variables as discussed in additional detail below, the use of the phrase sampling or tracing rate can encompass either the probability or the rate unless accompanied by a reference to time.

As part of the sampling in step 42, the sampled records are conventionally stored in memory of the server in which the traced task resides. Some or all of the sampled records are subsequently sampled by processor 16 for storage in what is called hereinafter a sample depot in step 44. The sample depot resides in memory 16 of control server 12, but the sample depot can also be stored remotely.

Figure 3:
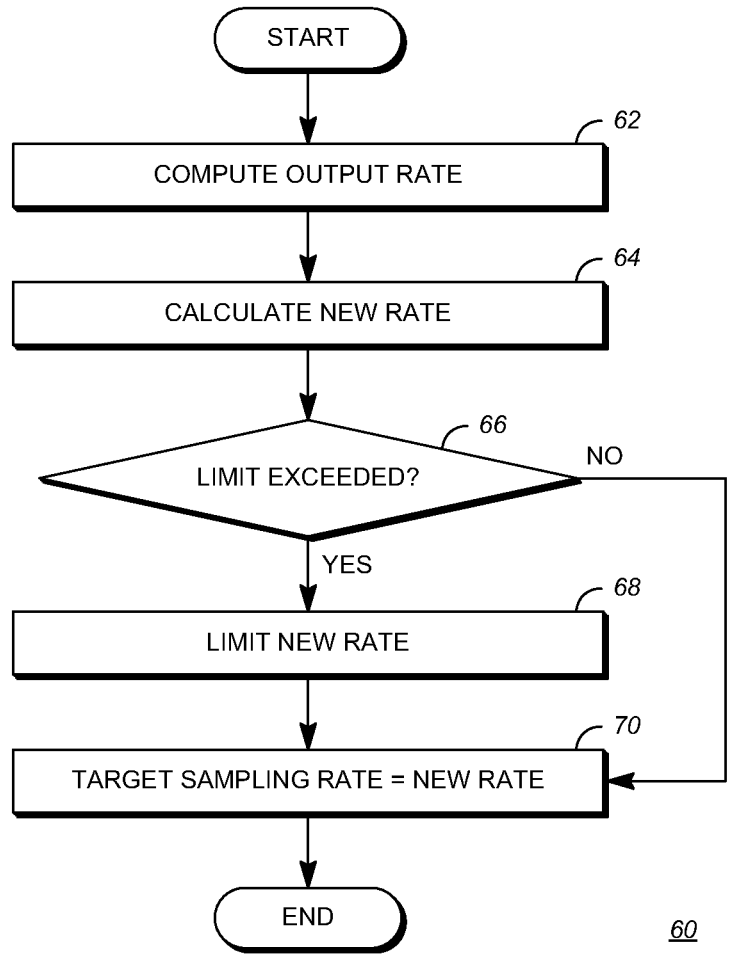
FIG. 3 is a flow chart showing processing of a control server generating a target sampling rate for the processing of FIG. 2 according to an embodiment.

A new target sampling rate is determined for a processing job in step 46 using the sampled records. FIG. 3 is a flow chart showing processing 60 of a control server generating a target sampling rate for the processing of FIG. 2 according to an embodiment. In this example of the processing of step 46, data from the sample depot is used to compute the effective output rate (before sampling) for a task in step 62. The effective output rate provides a measure of the amount of data being produced by the processing job that is available for sampling. In some embodiments, the effective output rate is the raw (unsampled) rate of traces per unit of time produced. For example, if 20 traces/second are observed and the sampling probability is 1/1000, the effective output rate is 20,000 traces/second.

Using the output rate and a minimum desired sampling rate (k samples per second), control server 12 calculates a new rate (as a sampling probability of 1-nth of the total) for the processing job in step 64. Using the example above, a new rate of 1/2000 would apply to achieve a minimum sampling rate of ten traces/second. The minimum desired sampling rate is a measure of the minimum amount of samples (also called a minimum tracing quota) needed to profile a particular task or job and can be determined by experimentation and/or can be set by a user.

The new rate from step 64 is adjusted, if needed, to conform to any maximums set by the affected source jobs starting in step 66. More specifically, the amount of data to be generated by the new rate can cause some limit to be exceeded (such as the upstream requesting task overloading a downstream processing job). One reason for this is because, in general, the load on the downstream resource, such as database 34 described above, is greater than the sum of the sampling rates for the tasks accessing the downstream resource because the root of the jobs associated with those tasks is generally more than one task away and/or because more than one job is requesting tracing data from the downstream resource at one time. This applies a multiplicative factor to the requirements, such as the memory requirements, required by the downstream resource that is associated with the traces. As a result, for example, worker servers 28 could each be accessing a single database server and that server may limit the tracing overhead it can accept from incoming RPCs to a maximum value that results in lower sampling rate that that of the minimum desired sampling rate. The limitation imposed by the downstream resource can result from memory, processor or other resource limitations.

The requirements imposed on a server by the collected data at any particular sampling rate can be determined from, for example, a so-called service dependency model generated using the sampling depot. The requirements vary depending on the trace request, the task subject to the trace request (also called a source task) and any child tasks of the source task. Since one of the parameters for a trace request as described herein is the job with which the task being traced is associated, the volume of data generated by tracing one or more tasks of the job by the trace request can be linked to the job, even if the task is remote from the root task of the job. Assuming generally that most jobs exhibit relatively stable RPC rates over time, the service dependency model can be implemented as steady-state relationships graphing sampling rates to the volume of generated data in the sample depot. This is helpful since, due to the multiplicative factors above, a generally non-linear relationship can exist between processing requirements of a server and the sampling rates of tasks or jobs operating on that serer. The limit of step 66 could be specified as a volume of memory based on the actual volume of data at the new rate calculated in step 64. However, this would require calculations of the actual size of the traces and could involve significant resources. In many situations, traces conform to a range of sizes, such as 10-500 kilobytes. If one assumes a constant trace size towards the higher end of this range for all sampled records, the limit can be specified in step 66 as a number of traces using the relationships in the service dependency model.

As mentioned above, the limit of step 66 can be associated with memory or other constraints of downstream resources, such as database server 34. Accordingly, where a job having multiple tasks is involved, such as multiple RPCs communicating between various servers in a multi-tier server arrangement, more than one limit could be calculated. The new rate would be constrained by all of these limits so that, in general, the new rate would be the lowest of the limits.

If a limit would be exceeded at the new rate in step 66, processing advances to step 68 to limit/adjust the new rate, and the target sampling rate is set to the new rate in step 70. In this way, maximum tracing quotas such as those imposed at a particular server can be enforced. Where a limit would not be exceeded, processing advances directly to step 70 to set the target sampling rate to the new rate calculated in step 64. In this way, the processing of FIG. 3 can be used to enforce a maximum tracing quota or volume for a job.

The processing of FIG. 3 ends after the target sampling rate is determined in step 70.

This discussion of the processing of FIG. 3 works well when a maximum tracing quota (i.e., the limit or limits of step 66) can be applied against a single job to determine a target sampling rate for that job and all tasks associated with that job. Where multiple jobs depend from one or more common resources, as is typical, the limit or limits of step 66 would need to be compared to the total load resulting from all jobs relying on the common resource. For example, when two jobs include a respective task accessing a single database, such as coordinator server 20 and worker server 28a each including a task communicating with one or more tasks on database 34, the database limit for tracing overhead would be implicated. Even if the two jobs had the same sampling probabilities, the observed sampling rate in traces per unit of time could vary based on the effective output rate calculated in step 62. Therefore, the two jobs can have very different effects on the resources of database 34. The total effect of each based on the new rate can be calculated in a similar manner to that described above. If the limit is exceeded in step 66, the resulting reduction needs to be divided between them. That is, the limit in step 66 may need to be enforced against more than one job.

Various methods could be used to apply the limit to the rates of the multiple jobs. According to one implementation, a new rate for each job associated with an incoming task to the resource, such as an incoming RPC, could be lowered until a projected trace volume is equal to or below the limit by some threshold, such as ten percent. Reduction could be done on a proportional basis using the effective output rate by example or by lowering the rate for the job that contributes most to the trace volume based on the model. When lowering the rate for the job that contributes most, the rate could be reduced until the job is no longer the highest contributor or until there is no overload, whichever is first. If an overload remains after the rate is reduced, the next highest contributing job can be so adjusted, and so on, until there is no overload. Alternatively, if a rate for one job is above its minimum desired sampling rate, while others rates are not, that rate could be reduced first.

Note that, when referring to a common server or common resource on which more than one task relies, the tasks could be communicating with a common downstream job, where the common job itself is operating on multiple servers or resources such that the limit is based on a limit imposed on that job.

An example of the sample depot storage scheme used in an embodiment described above can be illustrated by assuming, for example, the existence of four tasks. The first task ("websearch") sends a RPC to storage database 34 from coordinator server 20 based on an incoming query from an external user, while the second task ("ads") sends a RPC to storage database 34 from worker server 28a based on an incoming query from another external user. Storage database 34 runs two tasks responsive to the RPCs. The data associated with a trace of each task is then sampled and stored to the depot, where control server 12 reads and analyzes it. Where job names have the format user/job/cluster, the depot stores data in a format of:

<requesting task, sampling task(client), sampling task (server), trace id, time, trace parameters . . . >

According, entries in the sample depot would for these tasks would be:

www/user1/loadbalancer, www/user1/loadbalancer, websearch/user1/US, 0x1111111, 01:15:23.455 Dec. 2, 2011, . . . .

www/user1/loadbalancer, websearch/user1/US, database/database_server/US, 0x1111111, 01:15:23.456 Dec. 2, 2011, . . . .

www/user1/loadbalancer, www/user1/loadbalancer, ads/user1/US, 0x1111112, 01:17:28.788 Dec. 2, 2011, . . . .

www/user1/loadbalancer, ads/user1/US, database/database_server/US, 0x1111112, 01:17:28.789 Dec. 2, 2011, . . . .

This shows 2 traces:

0x1111111: loadbalancer→web user1→database; and

0x1111112: loadbalancer→ads user1→database; wherein a load balancing server (loadbalancer) described above with respect to FIG. 1 is making all sampling decisions.

Note that sampled data in the sample depot and used to form the service dependency model that is generally stored with the sample depot is desirably discarded after a period of time. For example, sampled records could be collected in the sample depot starting over a period of 1-2 hours so as to generate the statistics for the service dependency model. New sampled records could be added to the sample depot during the processing of FIG. 2, and the service dependency model would then be updated at defined intervals. Sampled records could then be discarded from the sample depot so that they are not used in determining the service dependency model after some additional period of time passes, such as four hours after being collected by example. In this way, the service dependency model remains relatively accurate and up-to-date.

Referring again to FIG. 2, after the target sampling rate(s) are determined by control server 12 in step 46, processing advances to optionally determine whether the sampling rate should be changed to the target sampling rate in one step in step 48. Basically, discontinuities in the resulting data can be avoided if the sampling rate is slowly adjusted, such as over a period of hours, particularly where the target sampling rate is different from the existing sampling rate by an amount sufficient to cause such discontinuities. The sampling rate generally should be changed in proportion to the size of the affected job as the data quality of smaller jobs is more sensitive changes in sampling rate. If the rate should not be changed in one step in step 48, processing advances to limit the sampling rate to a value between the existing sampling rate and the target sampling rate in step 50. For example, a high change in traffic associated with a processing job might result in a desired change in sampling probability from 1/1000 to 1/100,000. Instead of an immediate change, the new sampling rate is limited so that a smaller change occurs. For example, the next sampling rate could be limited to one based on a sampling probability of 1/4000 in step 50. In this way, the target sampling rate would be implemented over a period of time. Moreover, if the rate changes to a value in between, for example one based on a sampling probability of 1/10,000, hunting can be minimized. If the sampling rate is not to be limited by the response to the query of step 48, the new sampling rate is the target sampling rate.

Whether or not the sampling rate is limited in step 50, the control library is updated in step 52 before the processing of FIG. 2 ends. The control library could be updated by a command issued by CPU 14, or another server such as one on which the control library may be stored could sample memory 16 of control server 12 to retrieve the rate. Sampling rate updates for a particular job, or for groups of named jobs (such as all jobs owned by a particular user as discussed hereinafter), can be stored in the control library. Rates can be distributed from the control library to named processing jobs when, for example, there is a change in rate. Alternatively, rates could be updated on a periodic basis, such as hourly, whether or not there is a change. In yet another embodiment, rate changes for a number of processing jobs could be sent in a staggered fashion over a period of time.

Steps 48-52 can be implemented formulaically in one example by adjusting each sampling rate r towards the target sampling rate $r_{target}$ according to the following:

$$r_{new} = \alpha(r_{target} - r) + r \text{ if } abs(r - r_{target}) > \Delta; \text{ and}$$

$$r_{new} = r_{target} \text{ if } abs(r - r_{target}) \geq \Delta; \text{ wherein}$$

$r_{new}$ is an adjusted sampling rate;

α has a value 0<α<1; and

Δ has a value dependent upon the tolerable level of discontinuity for a processing job as specified by a consumer of the aggregate data. For example, 0.1 samples per second may be a suitable cutoff in certain embodiments.

This causes sampling rates to converge towards their desired levels and to snap to a desired level when the desired level and existing sampling rate are close enough.

Although the calculation of new sampling rates and the distribution of those rates are described generally as part of a single program (the processing of FIG. 2) in this example, in certain embodiments it is more preferable to have separate programs for calculation and distribution. This would result in additional isolation between the functions to protect against malfunctions, particularly protecting against malfunctions in the more complex operations of the calculation from those in the relatively straightforward distribution operation. In such an embodiment, for example, the new target rates could be sent to a program associated with the control library, and that program could decide what value should be updated in the control library and when based on the teachings above.

Additional enhancements can be added to the basic processing described above.

In the normal processing described above, the sampling rate is gradually adjusted to the target sampling rate when the target sampling rate and the existing sampling rate are separated by a difference above a defined value. However, it may be desirable to limit the rate at which the sampling rate is increased (to prevent overloads, for example), but not the rate at which the sampling rate can be decreased (as this may be in response to a spike in activity). Accordingly, implementing spike detection can be useful where a surge in trace volume from a job is rapid and severe enough to immediately impact the health of the collection and analysis pipeline given the known steady-state expectations. To achieve this goal, each task can be instrumented with a counter to track how much data is being produced by a job. This counter can be compared to a threshold based on those records expected based on the sampling rate. If the comparison shows that the counter exceeds the threshold by a relatively large margin, an immediate update to the job's sampling rate can be computed and distributed. This would immediately reduce the job's sampling rate, without waiting for the relevant data to update in the normal extended manner (e.g. one hour or longer).

As mentioned above, the service dependency model can be used to generate a steady-state graph relating sampling rates for a job to resulting loads caused by the sampled records. This can be as simple as relating the requesting job (and its sampling rate) to the processing job as a whole to calculate maximum sampling rates that will enforce quotas on the requesting job. In a variation, the service dependency model links sampling rate with collected data for a respective task. In this case, more complex calculations could be used to determine the limit(s) in step 66 because each task of a job would have to have its tracing overhead separately calculated for a server. Moreover, special-case logic may be required to handle jobs that are circularly dependent on each other—that is, jobs having a task that communications with itself.

Instead of setting tracing quotas for each job individually, a quota can be set for whole classes of jobs or by user. For example, if a unique job is represented by a user, a data center and a job name, hierarchical quotas could be designated for, among others, any job owned by the user or any job in the given data center. There may then be multiple quotas that apply to a given job, so it is desirable to define an order that specifies which quota will be applied in preference to others. Similarly to the procedure described above, these quotas could be applied proportionally or otherwise.

The dynamic sampling rate adjustment taught herein provides a way to control tracing rates over an entire network while allowing the set up and enforcement of minimum and maximum traced-query per second (qps) rates. In this example, only one sample depot is used. It is also be possible to implement this algorithm with multiple sample depots, where each receives a randomly selected subset of the trace records generated by the overall system. Use of one or more sample depots provides the ability of a central operator to grant additional tracing resources upon request and to automatically detect and respond to trace volume spikes.

The embodiments of control server 12, coordinator server 20 and/or worker servers 28a-28N (and the algorithms, methods, instructions, etc. stored thereon and/or executed thereby) can be realized in hardware, software, or any combination thereof. The hardware can include, for example, intellectual property (IP) cores, application-specific integrated circuits (ASICs), programmable logic arrays, optical processors, programmable logic controllers, microcode, microcontrollers, servers, microprocessors, digital signal processors or any other suitable circuit. In the claims, the term "processor" should be understood as encompassing any of the foregoing hardware, either singly or in combination or any other device capable of processing information. Further, portions of servers 12, 20, 28a-28N do not necessarily have to be implemented in the same manner.

Further, in one embodiment for example, control server 12, coordinator server 20 or each worker server 28a-28N can be implemented using a general purpose computer/processor with a computer program that, when executed, carries out any of the respective methods, algorithms and/or instructions described herein. In addition or alternatively, for example, a special purpose computer/processor can be utilized which can contain specialized hardware for carrying out any of the methods, algorithms, or instructions described herein.

All or a portion of embodiments of the present invention can take the form of a computer program product accessible from, for example, a computer-usable or computer-readable medium. A computer-usable or computer-readable medium can be any device that can, for example, tangibly contain, store, communicate, or transport the program for use by or in connection with any processor. The medium can be, for example, an electronic, magnetic, optical, electromagnetic, or a semiconductor device. Other suitable mediums are also available.

The above-described embodiments have been described in order to allow easy understanding of the present invention and do not limit the present invention. On the contrary, the invention is intended to cover various modifications and equivalent arrangements included within the scope of the claims, which scope is to be accorded the broadest interpretation so as to encompass all such modifications and equivalent structure as is permitted under the law.

What is claimed is:

1. A method of dynamically adjusting sampling rate for statistical data collection, the method comprising:
receiving records associated with a first task communicating with a second task and sampled at a first sampling rate, at least the first task associated with a first processing job;
determining a target sampling rate for the first processing job using the records to calculate a measure of an amount of data being produced that is available for sampling, the target sampling rate based on the measure, a minimum sampling quota and a maximum sampling quota;
comparing the target sampling rate to the first sampling rate using a processor;
determining whether to adjust the first sampling rate to the target sampling rate based on a result of the comparison;
receiving second records associated with a third task communicating with a fourth task and sampled at a second sampling rate, at least the third task associated with a second processing job, and at least one task associated with the first processing job and at least one task associated with the second processing job performed by a common server;
determining a second target sampling rate for the second processing job using the second records, the second target sampling rate based on a second minimum sampling quota and the maximum sampling quota;
comparing the second target sampling rate to the second sampling rate;
determining whether to adjust the second sampling rate to the second target sampling rate based on a result of the comparison; and
determining the maximum sampling quota based on a limitation of the common server;
wherein determining the target sampling rate comprises:
computing the measure as an unsampled output rate for the first task using the records;
calculating a desired minimum sampling rate using the minimum sampling quota and the unsampled output rate; and
selectively adjusting the desired minimum sampling rate based on a comparison of the desired minimum sampling rate with the maximum sampling quota to obtain the target sampling rate; and
wherein determining the second target sampling rate comprises:
computing a second unsampled output rate for the third task using the records;
calculating a second desired minimum sampling rate using the second minimum sampling quota and the second unsampled output rate; and
selectively adjusting the second desired minimum sampling rate based on a comparison of the second desired minimum sampling rate with the maximum sampling quota to obtain the second target sampling rate.

2. The method of claim 1, further comprising:
adjusting the first sampling rate r according to:

$$r_{new} = \alpha(r_{target} - r) + r \text{ if } abs(r - r_{target}) > \Delta; \text{ and}$$

$$r_{new} = r_{target} \text{ if } abs(r - r_{target}) \geq \Delta$$

when the target sampling rate $r_{target}$ is greater than the first sampling rate r; and wherein
$r_{new}$ is an adjusted sampling rate;
$\alpha$ has a value $0 < \alpha < 1$; and
$\Delta$ has a value dependent upon a defined level of discontinuity in the records.

3. The method of claim 2, further comprising:
adjusting the first sampling rate r to the target sampling rate $r_{target}$ when the target sampling rate $r_{target}$ is greater than the first sampling rate r.

4. The method of claim 1 wherein selectively adjusting the first desired minimum sampling rate and selectively adjusting the second desired minimum sampling rate comprises:
summing a quantity of records associated with the at least one task of the first processing job performed by the common server that would be sampled at the first desired minimum sampling rate and a quantity of records associated with the at least one task of the second processing job performed by the common server that would be sampled at the second desired minimum sampling rate to obtain a sampling volume; and
reducing the first desired minimum sampling rate and the second desired minimum sampling rate in proportion to their effects on the limitation of the common server when the sampling volume is above the maximum sampling quota until the sampling volume is at or below the maximum sampling quota.

5. The method of claim 1 wherein selectively adjusting the first desired minimum sampling rate and selectively adjusting the second desired minimum sampling rate comprises:
summing a quantity of records associated with the at least one task the first processing job performed by the common server that would be sampled at the first desired minimum sampling rate and a quantity of records associated with the at least one task of the second processing job performed by the common server that would be sampled at the second desired minimum sampling rate to obtain a sampling volume; and
reducing whichever of the first desired minimum sampling rate and the second desired sampling rate is a highest contributor to the sampling volume when the sampling volume exceeds the maximum sampling quota until the highest contributor changes to the other of the first desired minimum sampling rate and the second desired sampling rate or until the sampling volume is at or below the maximum sampling quota.

6. A method of dynamically adjusting sampling rate for statistical data collection, the method comprising:

receiving records associated with a first task communicating with a second task and sampled at a first sampling rate, at least the first task associated with a first processing job;

determining a target sampling rate for the first processing job using the records, the target sampling rate based on a minimum sampling quota and a maximum sampling quota;

comparing the target sampling rate to the first sampling rate using a processor; and determining whether to adjust the first sampling rate to the target sampling rate based on a result of the comparison;

wherein the first sampling rate is represented by a first sampling probability and the target sampling rate is represented by a target sampling probability, the method further comprising:

collecting samples resulting from sampling the first task at the first sampling probability over a plurality of sampling cycles in a sample depot; and wherein determining the target sampling rate includes:

calculating the first sampling rate in samples per unit of time using the sample depot;

calculating an unsampled output rate for the first task using the first sampling probability and the first sampling rate; and calculating the target sampling probability required to obtain the minimum sampling quota using the unsampled output rate.

7. The method of claim 6, further comprising:

determining the maximum sampling quota as a volume of memory designated by a limitation of a server performing the first task; and wherein determining the target sampling rate further includes:

calculating a memory allocation required by the server for the first processing job if the first task were sampled at the target sampling probability; and reducing the target sampling probability when a total memory allocation required by the server for any processing jobs using the server exceeds the maximum sampling quota, the total memory allocation including the memory allocation required by the server for the first processing job.

8. An apparatus for dynamically adjusting sampling rate for statistical data collection, the apparatus comprising:

a server including memory and a processor configured to execute instructions stored in the memory to:

receive records associated with a first task communicating with a second task and sampled at a first sampling rate, at least the first task associated with a first processing job;

calculate, using the records, an effective output rate as a measure of an amount of data being produced that is available for sampling;

determine a target sampling rate for the first processing job using the effective output rate, a minimum sampling quota and a maximum sampling quota;

compare the target sampling rate to the first sampling rate;

determine whether to adjust the first sampling rate to the target sampling rate based on a result of the comparison;

receive second records associated with a third task communicating with a fourth task and sampled at a second sampling rate, at least the third task associated with a second processing job, and at least one task associated with the first processing job and at least one task associated with the second processing job performed on a common server;

determine a second target sampling rate for the second processing job using the second records, the second target sampling rate based on a second minimum sampling quota and the maximum sampling quota;

compare the second target sampling rate to the second sampling rate; and determine whether to adjust the second sampling rate to the second target sampling rate based on a result of the comparison; and determine the maximum sampling quota based on a limitation of the common server;

wherein the processor is configured to determine the target sampling rate and the second target sampling rate by:

calculating a memory burden on the common server expected by sampling the at least one task of the first processing job at a first rate required to meet the minimum sampling quota and by sampling the at least one task of the second processing job at a second rate required to meet the second minimum sampling quota;

comparing the memory burden to the maximum sampling quota; and reducing at least one of the first rate or the second rate when the memory burden is above the maximum sampling quota, the first target sampling rate based on the first rate after any reduction and the second target sampling rate based on the second rate after any reduction.

9. The apparatus of claim 8 wherein the processor is further configured to:

adjust the first sampling rate r according to:

$$r_{new} = \alpha(r_{target} - r) + r \text{ if } abs(r - r_{target}) > \Delta; \text{ and}$$

$$r_{new} = r_{target} \text{ if } abs(r - r_{target}) \leq \Delta; \text{ and wherein}$$

$r_{new}$ is an adjusted sampling rate;

$\alpha$ has a value $0 < \alpha < 1$; and $\Delta$ has a value dependent upon a defined level of discontinuity in the records.

10. The apparatus of claim 9 wherein the second task is one of the first task, a task associated with the first processing job or a task associated with the second processing job.

11. The apparatus of claim 8 wherein the processor is configured to reduce the at least one of the first rate or the second rate by:

reducing the first rate and the second rate in proportion to their respective contributions to the memory burden until the memory burden is less than the maximum sampling quota.

12. The apparatus of claim 8 wherein the processor is configured to reduce the at least one of the first rate or the second rate by:

reducing whichever of the first rate and the second rate is a highest contributor to the memory burden until the highest contributor changes to the other of the first rate and the second rate or until the memory burden is at or below the maximum sampling quota.

13. An apparatus for dynamically adjusting sampling rate for statistical data collection, the apparatus comprising:

a server including memory and a processor configured to execute instructions stored in the memory to:

receive records associated with a first task communicating with a second task and sampled at a first sampling rate, at least the first task associated with a first processing job;

calculate, using the records, an effective output rate as a measure of an amount of data being produced that is available for sampling;
determine a target sampling rate for the first processing job using the effective output rate, a minimum sampling quota and a maximum sampling quota;
compare the target sampling rate to the first sampling rate; and
determine whether to adjust the first sampling rate to the target sampling rate based on a result of the comparison, wherein the first processing job is one of a plurality of processing jobs operating between sets of at least two servers of the network, at least two of the plurality of processing jobs sharing a common server; and wherein the processor is configured to:
receive records associated with tasks of each of the plurality of processing jobs and sampled at a respective sampling rate;
determine the maximum sampling quota based on a limitation of the common server;
determine a respective target sampling rate for each processing job sharing the common server by:
calculating a memory burden on the common server expected by sampling the tasks at a respective rate required to meet a respective minimum sampling quota associated with each processing job sharing the common server;
comparing the memory burden to the maximum sampling quota; and
reducing at least one of the respective rates when the memory burden is above the maximum sampling quota, the respective target sampling rate for each processing job sharing the common server based on the respective rate associated with each processing job after any reduction;
compare the respective target sampling rate to the respective sampling rate for each processing job sharing the common server; and
determine whether to adjust the respective sampling rate to the respective target sampling rate based on a result of the comparison.

14. The apparatus of claim 13 wherein the processor is further configured to:
associate each processing job sharing the common server with a respective owner; and
sum a required memory of each respective owner as a portion of the memory burden based on those of the processing jobs associated with the respective owner; and
wherein the processor is configured to reduce the at least one of the respective rates by:
reducing the respective rates in proportion to the required memory of each respective owner until the memory burden is less than the maximum sampling quota; or
reducing those of the respective rates that are associated with whichever owner is a highest contributor to the memory burden until the highest contributor changes to another owner or until the memory burden is at or below the maximum sampling quota.

* * * * *